(12) United States Patent
Yamazaki et al.

(10) Patent No.: US 6,238,610 B1
(45) Date of Patent: May 29, 2001

(54) HEAT EXCHANGER TANK AND METHOD OF PRODUCING THE SAME

(75) Inventors: Hisarou Yamazaki, Tokyo; Seiichi Kusama, Aichi, both of (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 08/433,206

(22) Filed: May 2, 1995

(51) Int. Cl.$^7$ .............................. B29C 65/56; B29C 65/70
(52) U.S. Cl. ................................. 264/267; 264/274
(58) Field of Search .................................. 264/255, 250, 264/274, 296, 267, 268; 425/129.1

(56) References Cited

U.S. PATENT DOCUMENTS

| | | | |
|---|---|---|---|
| 5,008,060 | 4/1991 | Kanai et al. | 264/255 |
| 5,246,065 | 9/1993 | Huff | 165/173 |

*Primary Examiner*—Angela Ortiz
(74) *Attorney, Agent, or Firm*—Sughrue, Mion, Zinn, Macpeak & Seas, PLLC

(57) ABSTRACT

An apparatus and method for producing a tank or a heat exchanger. The apparatus includes molds which form the tank such that it has an open end, an annular skirt about the entire periphery of the open end, and an annular groove in the annular skirt. A space in the molds receives the skirt, and a projection on one of the molds urges the outer and inner side surfaces of the skirt toward each other after a resin has been injected into the annular groove. A guide surface extends from the bottom of the projection to a position substantially even with a bottom surface of the annular groove to govern the amount of deformation of the side surface which is urged by the projection. A bubble removal element, such as a protuberance or groove, is formed in the annular groove at a position where opposite ends of the resin impinge on each other when injected from an injection gate, to prevent bubbles from forming in the resin.

2 Claims, 10 Drawing Sheets

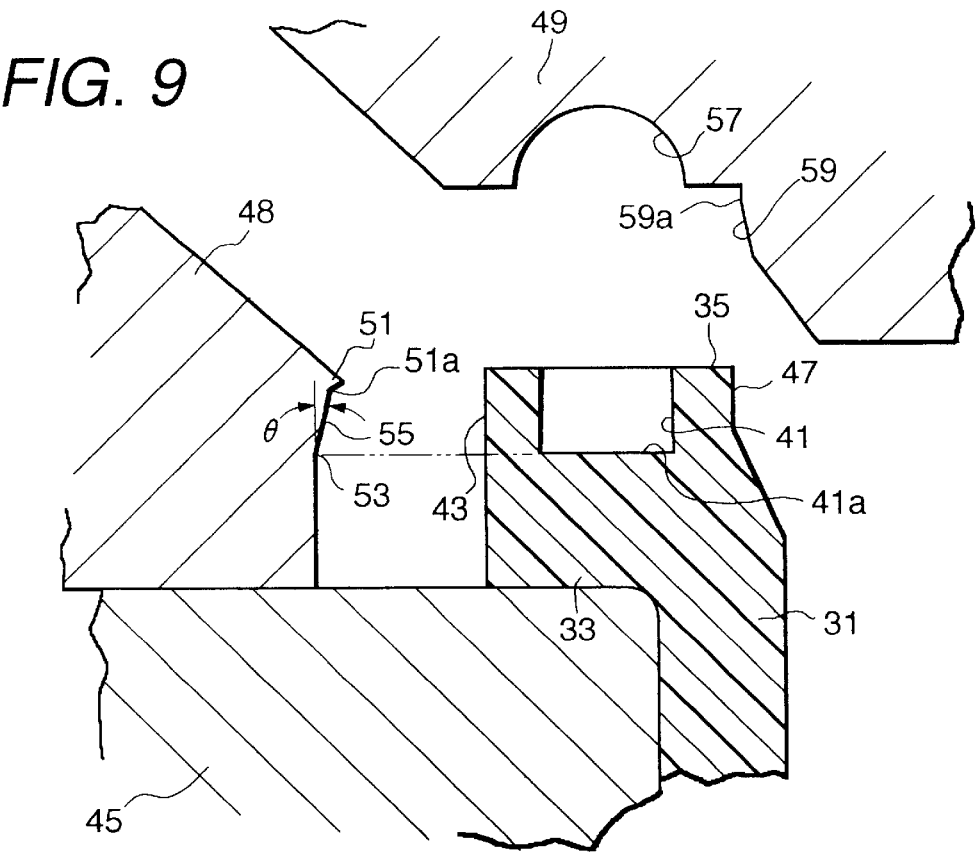
FIG. 9
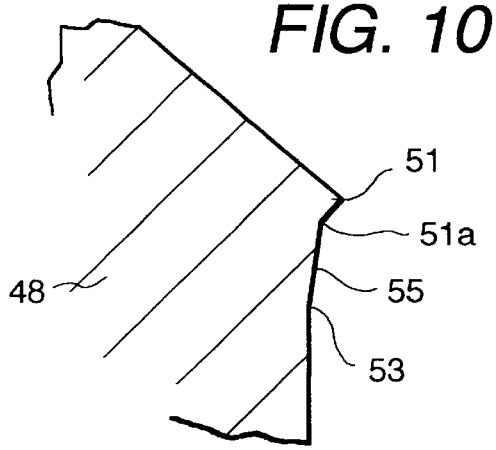
FIG. 10
FIG. 11

HEAT EXCHANGER TANK AND METHOD OF PRODUCING THE SAME

BACKGROUND OF THE INVENTION

1. Field of the Invention:

This invention relates to a heat exchanger for a radiator or the like, and more particularly to a tank for a heat exchanger in which a seal member is fixedly secured to a skirt portion of the tank, and a method of producing such a tank. The present invention further relates to an injection mold used for forming a resin seal member of the tank.

2. Description of the Related Art:

A conventional heat exchanger tank is shown in FIG. 1, in which a resin is injected into an annular groove 15 of a dovetail-shaped cross-section, formed in a skirt portion 13 of the tank 11, to mold a seal member 17 which is fixedly secured to the annular groove 15. Hence, disengagement of the seal member 17 from the tank 17 is highly unlikely.

In such a heat exchanger tank, the annular groove 15 of a dovetail cross-section must be formed on the skirt portion 13 of the tank 11. However, this shape of the annular groove 15 makes it very difficult to remove the tank 11 from a resin from which the tank 11 is molded.

One known heat exchanger tank-producing method which has solved such a problem is disclosed in Japanese Patent Unexamined Publication No. 3-138116.

Such a heat exchanger tank-producing method produces a tank as shown in FIG. 2, in which an annular groove 15 having a rectangular cross-section is formed in an open end surface of an annular skirt portion 13, which is formed over the entire periphery of an open end of a resin tank 11. The skirt portion 13 is received in a space formed by molds 18, 19 and 21.

An outer side surface 13a and an inner side surface 13b of the skirt portion 13 are held by molds 21 and 19, respectively, and the outer side surface 13a and the inner side surface 13b are urged toward each other by a projection 21a formed on the surface of each mold 21 facing the outer surface 13a of the skirt portion 13. Seal resin 23 is injected into the annular groove 15 and a seal-forming space 19a which is formed in the mold 19 opposed to the annular groove 15. The seal resin 23 solidifies, thereby producing the heat exchanger tank as shown in FIG. 1.

However, in such a conventional heat exchanger tank-producing method, the skirt portion 13 is deformed merely by pressing the projection 21a against the outer surface 13a. Therefore, it is difficult to deform the skirt portion 13 into a predetermined shape. Furthermore, cracks are likely to develop at the portion of the skirt portion 13 disposed laterally to the bottom surface 15a of the annular groove 15.

That is, the heat exchanger tank 11 is formed of a reinforced resin having glass fibers added to a nylon resin, and the tank has an elongated shape having one open end. Therefore, during molding, the tank is susceptible to twisting as well as deformation due to the expansion of its open end.

For example, the skirt portion 13 of the tank 11 having the outwardly-expanded open end is set on the mold 18 as shown in FIG. 3. Then the molds 19 and 21 are then moved toward the skirt portion 13, so that the upper end of the inner surface 13b of the skirt portion 13 of the tank 11 is positioned by the mold 19. In this condition, when the outer surface 13a of the skirt portion 13 of the tank 11 is pressed by the projections 21a of the molds 21, the outer surface 13a is deformed to a large extent by this pressing.

Since that portion of the skirt portion 13, defining one side wall of the annular groove 15 having the outer surface 13a, has a small thickness, deformation develops at that portion of the skirt portion 13 disposed laterally of the bottom surface 15a of the annular groove 15. Hence, it is likely that a crack may develop at this portion.

In a conventional heat exchanger tank that is produced by conventional methods, bubbles are formed in the resin injection-molded seal member 17 at a position located opposite to an injection gate.

In particular, a seal resin 23, injected from the injection gate 25, is divided in opposite directions at this injection gate 25, and flows toward the gate-opposite position 27 through an annular groove 15 in the tank 11 and a seal-forming space in a mold 19, as indicated by arrows in FIG. 4. However, since the temperature of the mold 19 is higher than the temperature of the tank 11, the fluidity of the seal resin 23 in the seal-forming space 19a becomes higher than the fluidity of the seal resin in the annular groove 15.

As a result, in the vicinity of the gate-opposite position 27, the seal resin 23 in the seal-forming space 19a is closer to the gate-opposite position 27 than is the seal resin 23 in the annular groove 15, as shown in FIG. 5A. Hence, immediately before the opposite ends of the seal resin 23 impinge on each other at the gate-opposite position 27, an air reservoir portion 28 is formed at the bottom surface of the annular groove 15 as shown in FIG. 5B. Then, when the opposite ends of the seal resin 23 are joined together at the gate-opposite position 27, bubbles 29 are formed in the seal resin 23, and also a space 30 in which the seal resin 23 is absent is formed, as shown in FIG. 5C.

In addition, in the conventional injection mold used for producing a tank, since a runner is formed in a sprue of a mold, it is very difficult to separate the runner from the mold 19.

SUMMARY OF THE INVENTION

The present invention overcomes the above problems of the conventional tank and tank producing method. Specifically, an object of the present invention is to provide a method of producing a tank for a heat exchanger in which a skirt portion of the tank can be positively deformed into a predetermined shape, and thus, a crack is prevented from developing at the skirt portion.

In the heat exchanger tank-producing method of the present invention, when the mold is pressed against the outer side surface or the inner side surface of the skirt portion, the outer side surface or the inner side surface of the skirt portion is deformed by the projection formed on the mold. The outer side surface or the inner side surface of the skirt portion therefore contacts the guide surface progressively from the side close to the open end surface, and is deformed along the guide surface, so that a bending moment, acting on that portion of the skirt portion disposed laterally of the bottom surface of the annular groove, is reduced. This prevents an undue stress from being applied to that portion of the skirt portion disposed laterally of the bottom surface of the annular groove.

A further object of the present invention is to provide a tank for a heat exchanger in which bubbles are prevented from being formed in that portion of a seal member where opposite ends of a seal resin have impinged on each other.

In the heat exchanger tank of the present invention, a bubble removal protuberance is formed on the portion of the bottom surface of the annular groove to be disposed at the impinging position where the opposite ends of the seal resin, injected from the injection gate, impinge on each other. Therefore, before the opposite ends of the seal resin are completely joined together at the impinging position, air present at the bottom surface of the annular groove impinges on the protuberance, and is discharged to a seal-forming space covering the annular groove.

In the heat exchanger tank of another embodiment of the present invention, a bubble removal notch or hole is formed on the portion of the annular groove portion to be disposed at the impinging position where the opposite ends of the seal resin, injected from the injection gate, impinge on each other. The notch or hole extends from the inner side surface of the annular groove to the outer surface of the skirt portion. Therefore, before the opposite ends of the seal resin are completely joined together at the impinging position, air present at the bottom surface of the annular groove impinges is discharged to the exterior through the notch or hole.

A further object of the present invention is to provide an injection mold in which a runner can be separated from the mold quickly and positively.

In the injection mold of the present invention, the abutment portions of the first and second molds are abutted against each other. In this condition when a resin is supplied through the sprue, the resin is injected through the gate portions into the product, and at the same time the resin fills in the well in the second mold.

Then, after the resin is solidified, the first and second molds are moved in the respective directions perpendicular to each other. Since the front end portion of the runner holder pin is embedded in that portion of a runner solidified in the well in the second mold, the runner holder pin prevents the runner from moving in the direction of movement of the first mold. The movement of the first mold causes that portion of the runner, solidified in the sprue in the first mold, to be automatically removed from the sprue.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, of which:

FIG. 9 is an enlarged view of a portion of the skirt portion shown in FIG. 8;

FIG. 10 is an enlarged view showing a guide surface of FIG. 9;

FIG. 11 is an enlarged view showing an inclined surface of FIG. 9;

DETAILED DESCRIPTION OF THE PREFERRED EMBODIMENTS

An embodiment of the present invention will now be described in detail with reference to the drawings.

Figure 1:
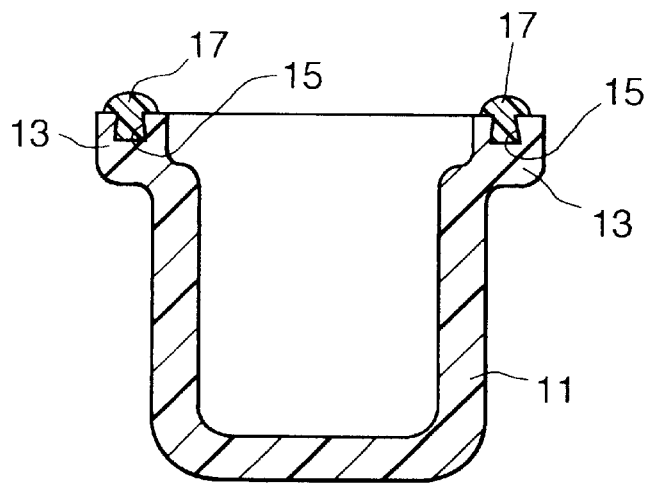
FIG. 1 is a cross-sectional view of a conventional heat exchanger tank.
Figure 2:
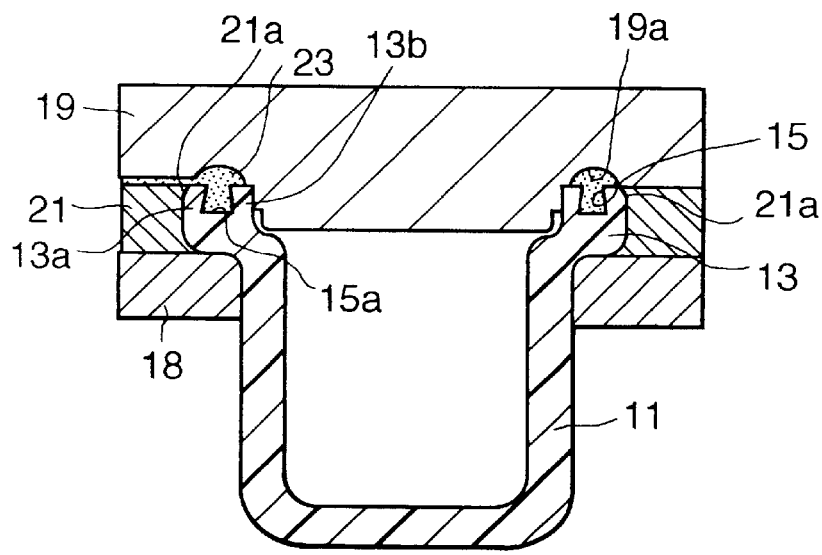
FIG. 2 is a cross-sectional view showing an apparatus used in the method of producing the heat exchanger tank of FIG. 1.
Figure 3:
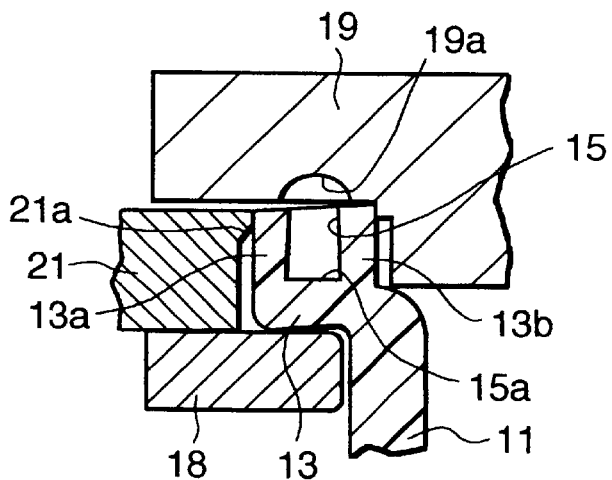
FIG. 3 is a view explanatory of a condition in which an open end of the tank is expanded outwardly when produced as shown in FIG. 2.
Figure 4:
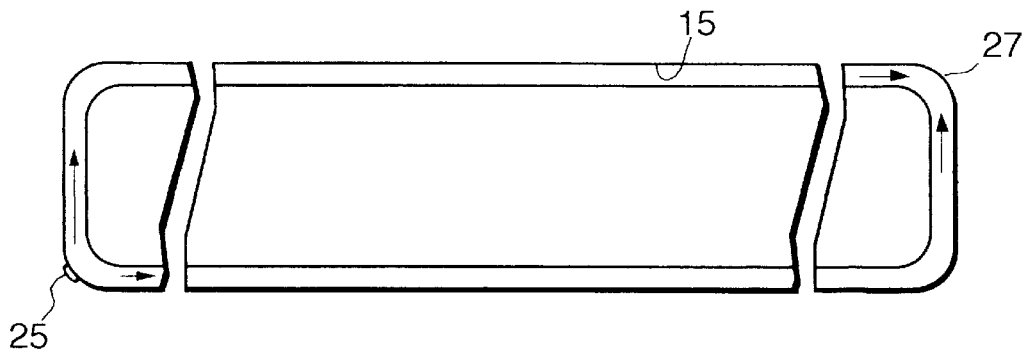
FIG. 4 is a view showing a flow of a seal resin in the heat exchanger tank of FIG. 1 at a gate-opposite position.
Figure 5A:
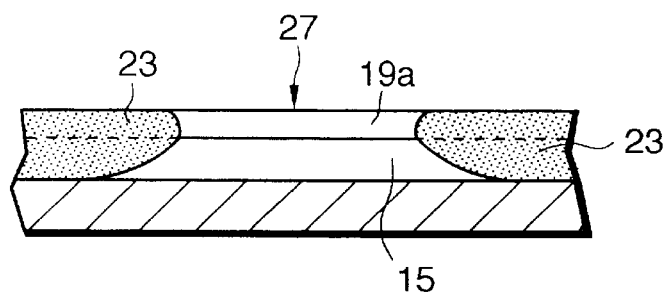
FIGS. 5A, 5B and 5C are views showing the flow of the seal resin in the heat exchanger tank of FIG. 1 at the gate-opposite position.
Figure 5B:
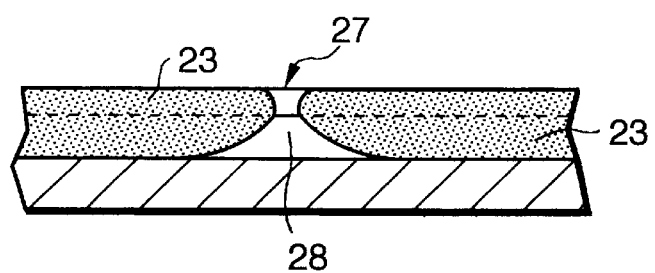
Figure 5C:
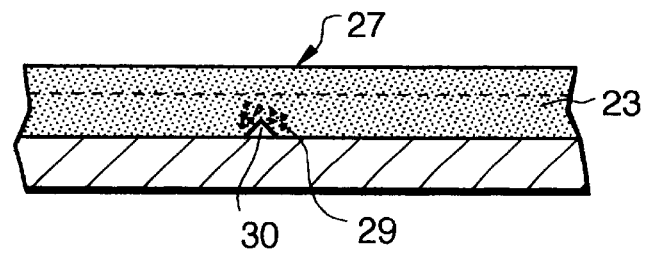
Figure 6:
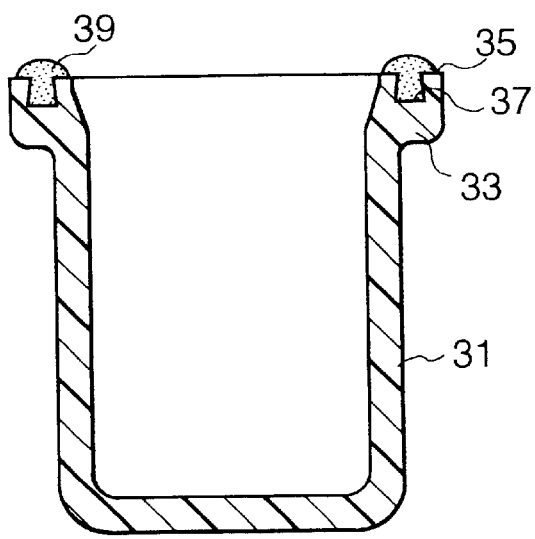
FIG. 6 is a cross-sectional view of a heat exchanger tank produced by a heat exchanger tank-producing method of the present invention.

FIG. 6 shows a tank for a heat exchanger produced by a method of the present invention. The resin tank 31 is made of a reinforced resin such as a resin having 30 wt. % glass fibers added to nylon 66 or the like. The tank 31 has an annular skirt portion 33 formed at an open end thereof over an entire periphery thereof, and an annular groove 37 of a generally dovetail-shaped cross-section is formed in an open end surface 35 of this skirt portion 33. An annular seal member 39 of a seal resin is fixedly secured at one side thereof in the annular groove 37. Examples of such seal resin include a silicon-based thermosetting resin and a nylon-based thermoplastic resin, and examples of such nylon-based thermoplastic resin include a polyamide elastomer, polyamide 11 and polyamide 12 or the like.

The above heat exchanger tank is produced in the following manner.

Figure 7:
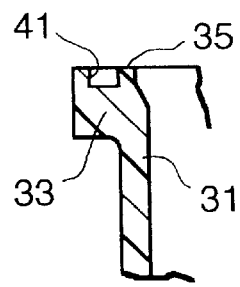
FIG. 7 is a cross-sectional view showing an annular groove of a rectangular cross-section formed in an open end of the heat exchanger tank.
Figure 8:
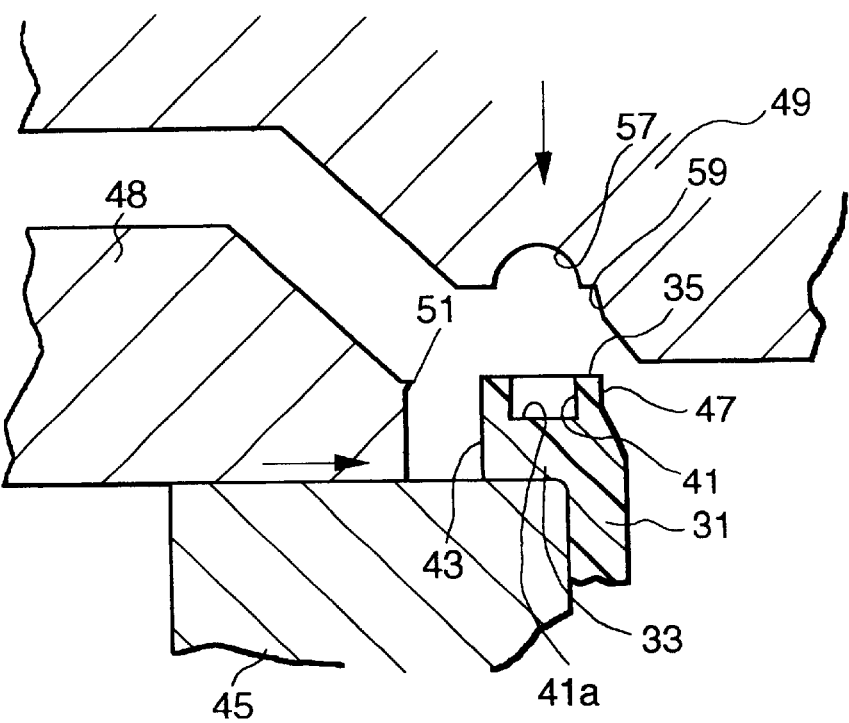
FIG. 8 is a cross-sectional view showing a skirt portion received in a space formed by molds.

First, a tank 31, as shown in FIG. 7, is molded by a resin tank-forming mold. The molded tank 11 therefore has an annular groove 41 of a rectangular cross-section formed in the open end surface 35 of the annular skirt portion 33. Then, the skirt portion 33 is received in a seal-forming mold as shown in FIG. 8. This seal-forming mold slide molds 48 for covering an outer side surface 43 of the skirt portion 33, a lower mold 45 for covering a lower surface of the skirt portion 33, and an upper mold 49 for covering the open end surface 35 and an inner side surface 47 of the skirt portion 33. The slide mold 48 is movable horizontally, and the upper mold 49 is movable upward and downward.

As shown on an enlarged scale in FIGS. 9 and 10, a projection 51 of a triangular cross-section for biting into the outer side surface 43 of the skirt portion 33 to prevent displacement is formed on that portion of the slide mold 48 to be opposed to that portion of the outer side surface 43 of the skirt portion 33 disposed in the vicinity of the open end surface 35. A guide surface 55 is formed on the slide mold 48, and extends straight from a bottom 51a of the projection 51 to that portion 53 of this slide mold 48 to be disposed in lateral registry with a bottom surface 41a of the annular groove 41. The guide surface 55 guides the deformation of the outer side surface 43 of the skirt portion 33 toward the annular groove 41, and is inclined at an angle θ.

A seal-forming space 57 is formed in the upper mold 49, and an inclined surface 59 for deforming the inner side surface 47 of the skirt portion 33 toward the annular groove 41 is formed on the upper mold 49, as shown on an enlarged scale in FIG. 11. In this embodiment, a vertical surface 59a also is formed above the inclined surface 59.

Figure 12:
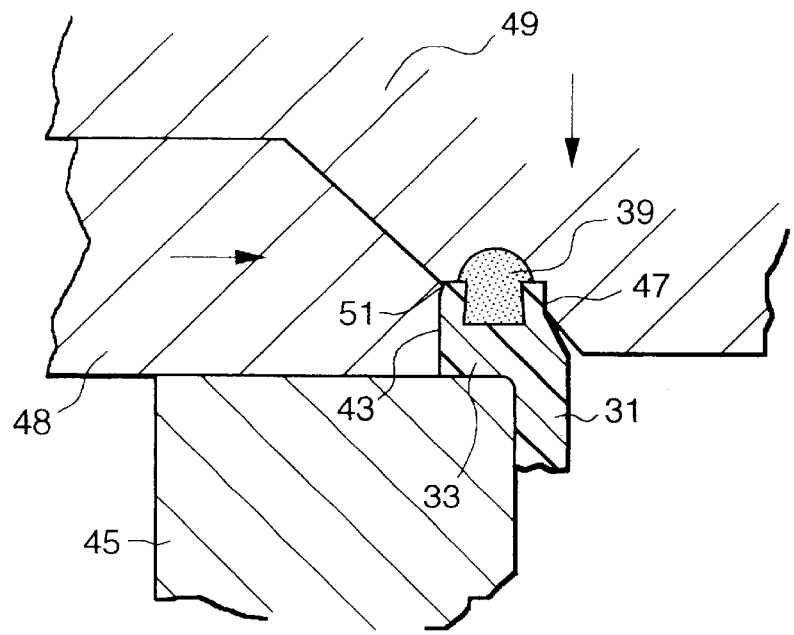
FIG. 12 is a cross-sectional view showing the skirt portion compressed by the molds.
Figure 13:
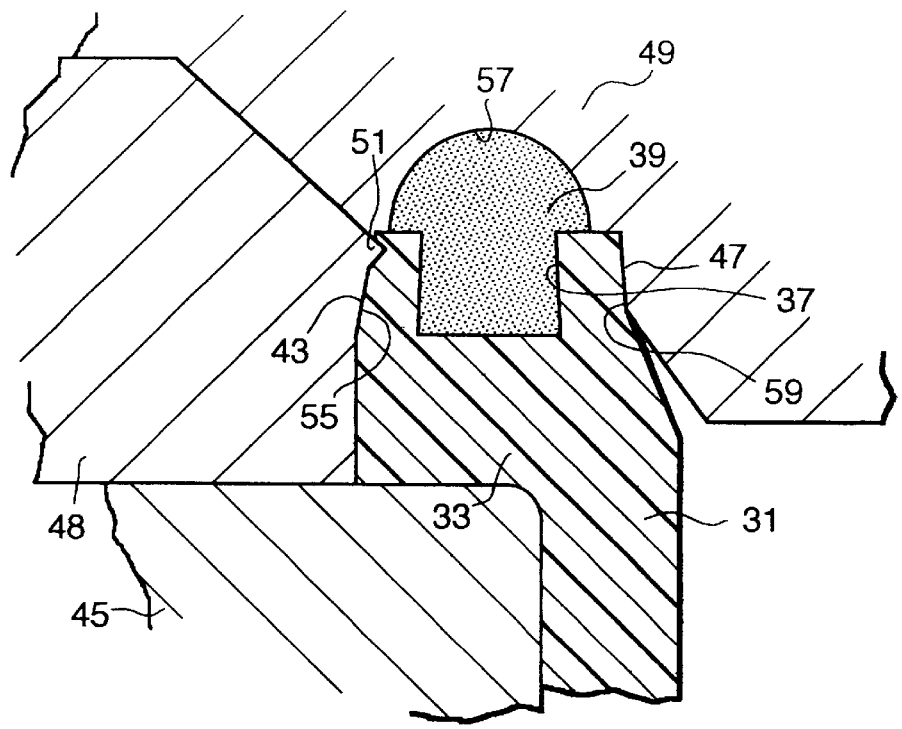
FIG. 13 is an enlarged view of an important portion of the skirt portion shown in FIG. 12.

After the skirt portion 33 is received in the above seal-forming mold, each slide mold 48 and the upper mold 49 are moved toward the skirt portion 33, so that the outer side surface 43 and inner side surface 47 of the skirt portion 33 are pressed toward each other by the slide mold 48 and the upper mold 49, as shown in FIG. 12. As a result of this pressing, the projection 51 bites into the skirt portion 33, and the guide surface 55 guides the deformation of the outer side surface 43 of the skirt portion 33 toward the annular groove 37. Thus, the inner side surface 47 of the skirt portion 33 is deformed toward the annular groove 41 by the inclined surface 59.

Then, in this condition, a seal resin is injected from a sprue (not shown), formed in the upper mold 49, into the annular groove 37, deformed into a dovetail shape, and the seal-forming space 57 formed in the upper mold 49 opposed to the annular groove 37. After injecting the seal resin, the seal resin is solidified and cooled, and then the slide molds 48 and the upper mold 49 are moved away from the skirt portion 33. As a result, there is provided the heat exchanger tank having the seal member 39 fixedly secured at one side thereof in the dovetail-shaped annular groove 37, as shown in FIG. 6.

In the above heat exchanger tank-producing method, the projection 51 is formed on that portion of the slide mold 48 to be opposed to that portion of the outer side surface 43 of the skirt portion 33 disposed in the vicinity of the open end surface 35. The guide surface 55 for guiding the deformation of the outer side surface 43 of the skirt portion 33 toward the annular groove 41 is formed on the slide mold 48, and extends from the bottom 51a of the projection 51 to the portion 53 of this slide mold to be disposed in lateral registry with the bottom surface 41a of the annular groove 41. Therefore, the skirt portion 33 of the tank 31 can be positively deformed into a predetermined shape, and cracks are prevented from developing at the skirt portion 33.

Namely, in the above heat exchanger tank-producing method, when the slide mold 48 is pressed against the outer side surface 43 of the skirt portion 33, the projection 51 formed on the slide mold 48 bits into the outer side surface 43 of the skirt portion 33. The skirt portion 33 is thus deformed along the guide surface 55, so that the skirt portion 33 can be positively deformed into the predetermined shape.

In the above heat exchanger tank-producing method, even if because of the deformation of the tank 31, the projection 51 abuts against the outer side surface 43 at an improper timing when clamping the molds, so that the outer side surface 43 of the skirt portion 33 is deformed to a large extent, cracks are prevented from developing at that portion of the skirt portion disposed laterally of the bottom surface 41a of the annular groove 41. Specifically, when the slide mold 48 is pressed against the outer side surface 43 of the skirt portion 33, the outer side surface 43 of the skirt portion 33 is deformed by the projection 51 formed on the slide mold 48.

The outer side surface 43 of the skirt portion 33 contacts the guide surface 55 progressively from that side thereof close to the open end surface 35, and is deformed along the guide surface 55, so that a bending moment, acting on that portion of the skirt portion 33 disposed laterally of the bottom surface 41a of the annular groove 41, will not increase. Thus, undue stress is prevented from being applied to that portion of the skirt portion disposed laterally of the bottom surface 41a of the annular groove 41. As a result, cracks are prevented from developing at that portion of the skirt portion 33 disposed laterally of the bottom surface 41a of the annular groove 41.

In the above embodiment, although the projection 51 is formed on that surface for facing the outer side surface 43 of the skirt portion 33, the present invention is not to be limited to such embodiment. That is, and the projection may be formed on the surface which faces the inner side surface 47, or in any other suitable position.

In the above embodiment, although the projection 51 has a triangular cross-sectional shape, the projection 51 is not to be limited to such shape, and may have any other suitable cross-section such as a rectangular cross-section.

In the above embodiment, although the inclined surface 59 and the vertical surface 59a are formed on the upper mold 49, the present invention is not to be limited to such arrangement. That is, the vertical surface 59a may be omitted.

As described above, in the heat exchanger tank-producing method of the present invention, the projection is formed on that portion of the mold to be opposed to that portion of the outer side surface or the inner side surface of the skirt portion disposed in the vicinity of the open end surface, and the guide surface for guiding the deformation of the outer side surface or the inner side surface of the skirt portion toward the annular groove is formed on the mold, and extends from the bottom of the projection to that portion of the mold to be disposed in lateral registry with the bottom surface of the annular groove. Therefore, the skirt portion of the tank can positively be deformed into the predetermined shape, and a crack is positively prevented from developing at the skirt portion.

Figure 14:
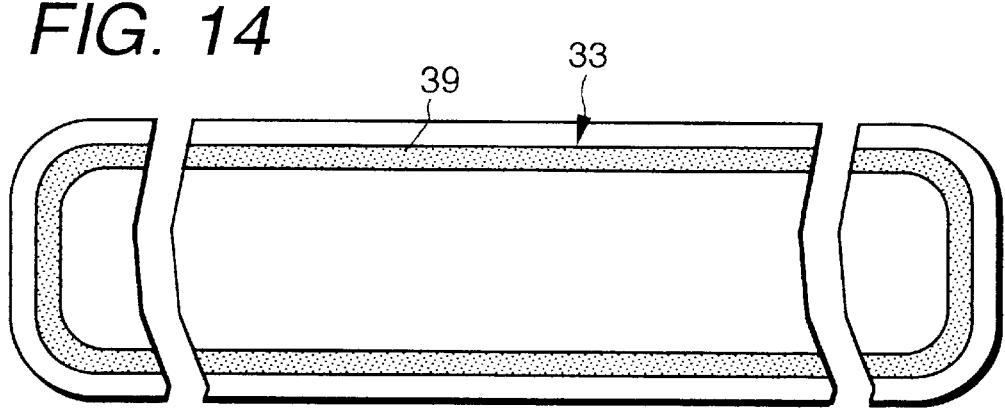
FIG. 14 is a top plan view of an embodiment of a heat exchanger tank of the present invention.
Figure 15:
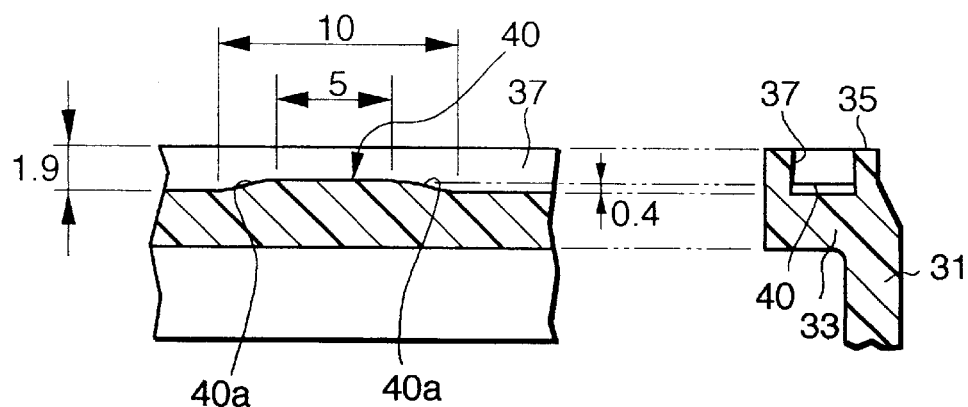
FIG. 15 is a view showing a protuberance formed on the heat exchanger tank at a gate-opposite position.

FIG. 14 is a plan view showing another embodiment of a heat exchanger tank of the present invention. In this embodiment, a silicon-based thermosetting resin is used as a seal resin, and a bubble removal protuberance 40, as shown in FIG. 15, is formed on that portion of a bottom surface of an annular groove 37 to be disposed oppositely to an injection gate. This protuberance 40 has such dimensions as shown in FIG. 15, and has slanting surfaces 40a formed respectively on opposite end portions thereof.

Figure 16:
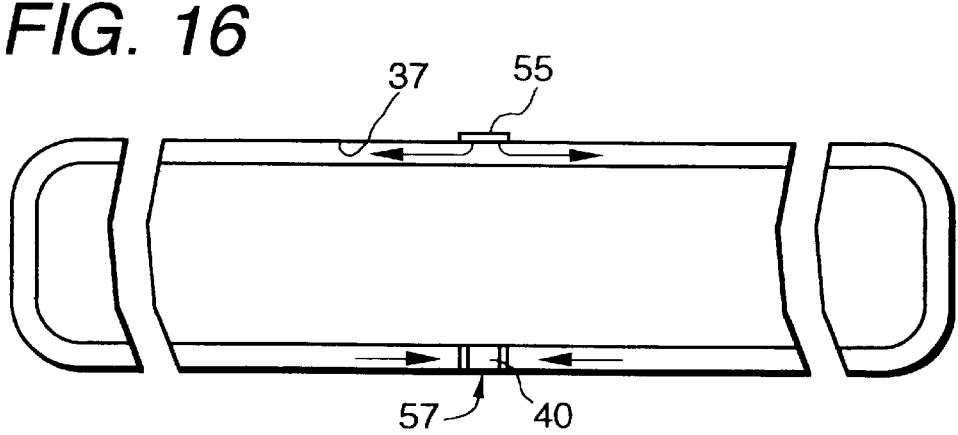
FIG. 16 is a view showing a flow of a resin in an annular groove in the heat exchanger tank of FIG. 14.

This heat exchanger tank is produced in the following manner:

As shown in FIG. 16, the seal resin 39a injected from the injection gate 55 is divided in opposite directions at the injection gate 55, and flows toward a gate-opposite position 57 through the annular groove 37 in the tank 31 and a seal-forming space 53 in an upper mold 49, as indicated by arrows. Then, the opposite ends of the seal resin are joined together at the gate-opposite position 57.

After the injection of the seal resin 39a, the mold is kept intact, allowing the seal resin 39a to solidify and cool. The upper mold 49 and slide molds 46 are then moved away from a skirt portion 33. As a result, a heat exchanger tank having a seal member 39 fixedly secured at one side thereof in the annular groove 37 of a dovetail-shaped cross-section is formed, as shown in FIG. 6.

In the above heat exchanger tank, the bubble removal protuberance 40 is formed on that portion of the bottom surface of the annular groove 37 to be disposed at the gate-opposite position 57 disposed oppositely to the injection gate 55. Therefore, before the opposite ends of the seal resin 39a are completely joined together at the gate-opposite position 57, the air present at the bottom surface of the annular groove 37 impinges on the protuberance 40, and is discharged to the seal-forming space 53 covering the annular groove 37. Hence, bubble-containing portion is positively prevented from developing in the seal member 39 at the gate-opposite position 57.

Figure 17A:
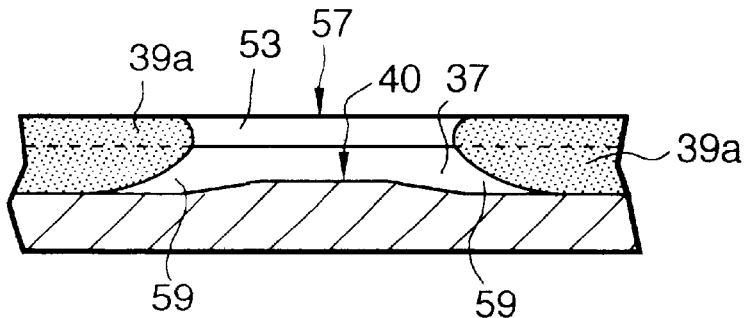
FIGS. 17A, 17B and 17C are views showing the flow of the seal resin in the heat exchanger tank at the gate-opposite position.

Specifically, in the heat exchanger tank described above, since the temperature of the upper mold 49 is higher than the temperature of the tank 31, the fluidity of the seal resin 39a in the seal-forming space 53 is higher than the fluidity of the seal resin 39a in the annular groove 37. As a result, in the vicinity of the gate-opposite position 57, the seal resin 39a in the seal-forming space 53 is closer to the gate-opposite position 57 than is the seal resin 39a in the annular groove 37, Hence, an air reservoir portion 59 is formed at the bottom surface of the annular groove 37, as shown in FIG. 17A.

Figure 17B:
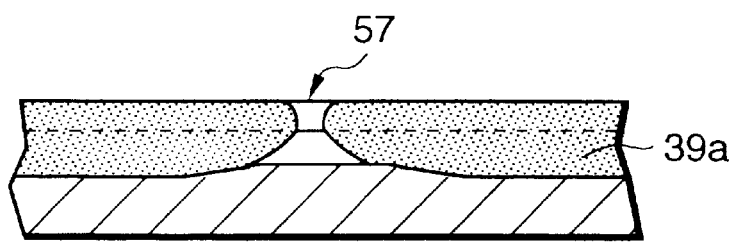
Figure 17C:
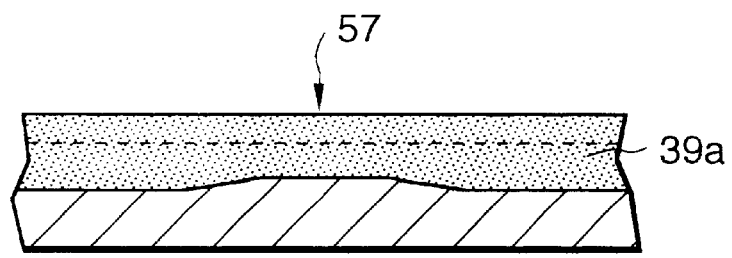

However, when the seal resin 39a comes closer to the gate-opposite position 57, the seal resin 39a moves over the protuberance 40 as shown in FIG. 17B. Air adjacent to the bottom surface of the annular groove 37 is therefore discharged to the seal-forming space 53 covering the annular groove 37, and is discharged to the exterior through a degassing portion formed in the mold. Then, the opposite ends of the seal resin 39a are joined together at the gate-opposite position 57, as shown in FIG. 17C.

Accordingly, bubbles are prevented from developing in the seal member 39 at the gate-opposite position 57.

Figure 18:
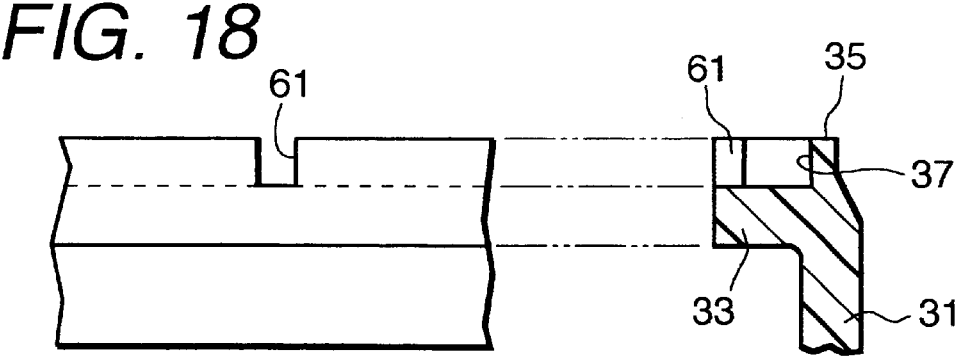
FIG. 18 is a view showing another embodiment of a heat exchanger tank of the present invention.

FIG. 18 shows another embodiment of the present invention. In this embodiment, a bubble removal notch 61 is formed in that portion of a side wall of the annular groove 37 to be disposed at the gate-opposite position 57 disposed oppositely to the injection gate 55. The notch 61 extends from an inner side surface of the annular groove 37 to an outer side surface of the skirt portion 33.

In the heat exchanger tank of this embodiment, when the seal resin 39a approaches the gate-opposite position 57, the air at the bottom surface of the annular groove 37 is discharged to the exterior through the notch 61. The opposite ends of the seal resin 39a are then joined together at the gate-opposite position 57. Therefore, the effect generally similar to that of the first embodiment can be achieved.

In this further embodiment, although the notch 61 extends from the inner side surface of the annular groove 37 to the outer side surface of the skirt portion 33, the present invention is not to be limited to such arrangement. That is, instead of the notch, a hole may be formed.

In the above embodiments, although the bubble removal protuberance 40 and the bubble removal notch 61 are formed at the position disposed opposite to the injection gate 55, the present invention is not to be limited to such embodiments. That is, the bubble removal protuberance 40 and bubble removal notch 61 may be formed at a position where the opposite ends of the resin mold injected from the injection gate 55 impinge on each other.

As described above, the bubble removal protuberance is formed on that portion of the bottom surface of the annular groove to be disposed at the impinging position where the opposite ends of the seal resin, injected from the injection gate, impinge on each other. Therefore, before the opposite ends of the seal resin are completely joined together at the impinging position, the air present at the bottom surface of the annular groove impinges on the protuberance, and is discharged to a seal-forming space covering the annular groove. Hence, bubbles are prevented from developing in the seal member at the seal resin-impinging position.

In the heat exchanger tank of the further embodiment, the bubble removal notch or hole is formed in that portion of the annular groove portion to be disposed at the position where the opposite ends of the seal resin, injected from the injection gate, impinge on each other. The notch or hole extends from the inner side surface of the annular groove to the outer surface of the skirt portion. Therefore, before the opposite ends of the seal resin are completely joined together at the impinging position, the air present at the bottom surface of the annular groove impinges is discharged to the exterior through the notch or hole. Hence, bubbles are prevented from developing in the seal member at the seal resin-impinging position.

Figure 19:
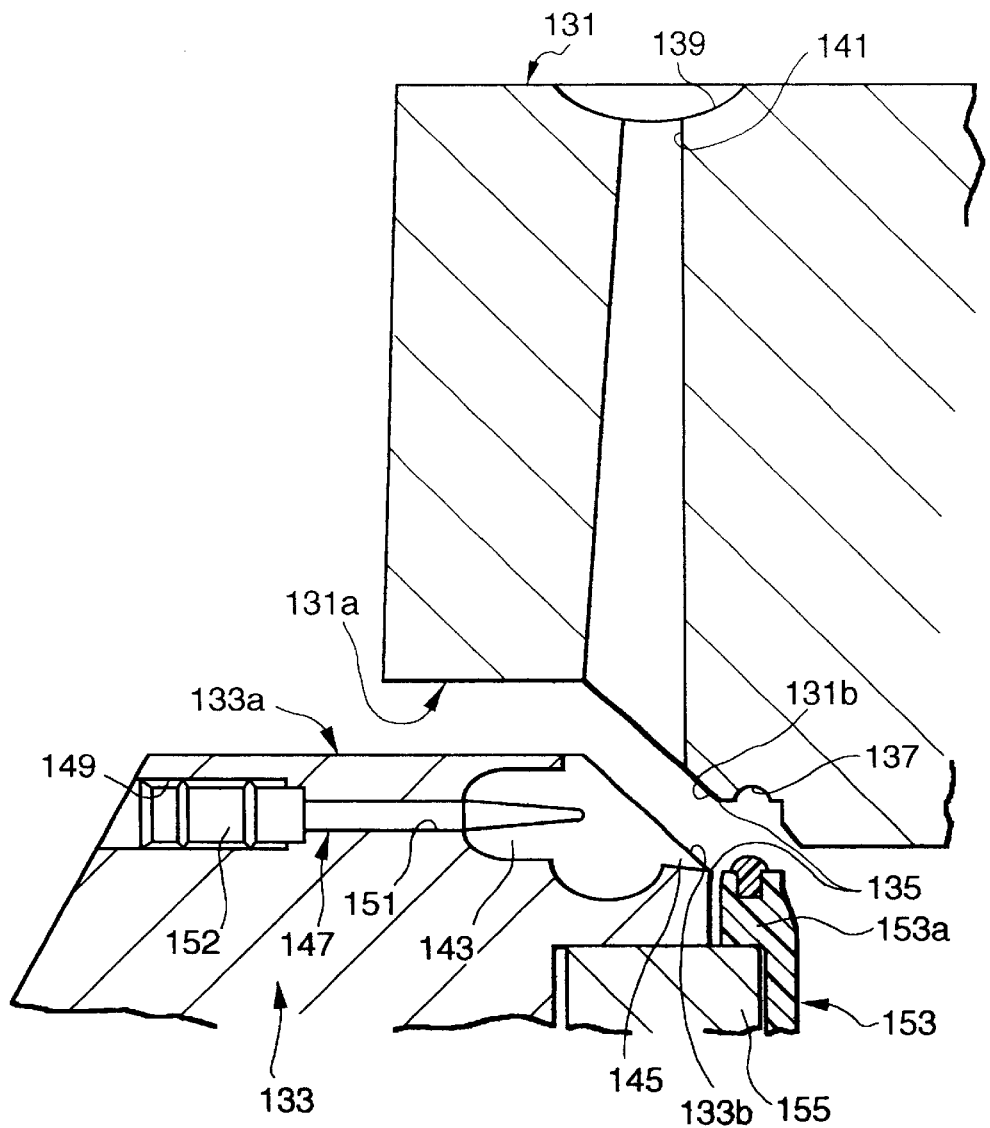
FIG. 19 is a cross-sectional view of a portion of one preferred embodiment of an injection mold of the present invention.

FIG. 19 shows a portion of an embodiment of the injection mold of the invention in detail. The mold includes a first mold 131 movable in a vertical direction, and reference a second mold 133 movable in a horizontal direction.

Slanting surfaces 131b and 133b are formed respectively on abutment portions 131a and 133a of the first and second molds 131 and 133, which can abut against each other. Gate portions 135 are formed at the slanting surfaces 131b and 133b, respectively, and a seal-forming space 137 is formed in the first mold 131 in adjacent relation to the gate portion 135 thereof.

In this embodiment, a gate port, defined by the gate portions 135 when clamping the mold, has a rectangular shape having a horizontal dimension of 10 mm and a vertical dimension of 0.3 mm. Of course, the gate portion can be of any suitable shape or dimension. A nozzle 139 and a sprue 141 are formed in the first mold 131. The sprue 141 is enlarged at that side thereof disposed adjacent to a well 143, and is closed by the slanting surface 131b.

The second mold 133 has the well 143 which is open to the slanting surface 133b, and has a bottom surface disposed at a level lower than the gate portion 135. A triangular space 145 is formed in that portion of the slanting surface 133b disposed adjacent to the gate portion 135. The space, however can be of any suitable shape or dimension. A runner holder pin 147 is mounted on the second mold 133.

In this embodiment, a threaded hole 149 and a through hole 151 are formed in the second mold 133, and extend horizontally. The runner holder pin 147 is inserted in these holes 149 and 151.

A rear end portion of the runner holder pin 147 is threadedly received in the threaded hole 149 while a front end portion of this pin 147 projects horizontally into the well 143.

The front end portion of the runner holder pin 147 is tapering toward its front end.

A degassing gap (not shown) is formed between the runner holder pin 147 and the through hole 151 in the second mold 133, and a degassing groove (not shown) is formed in a threaded portion 152 of the runner holder pin 147. A mold 155 for supporting a skirt portion 153a of a heat exchanger tank 153 is located at the inside of the second mold 133.

Figure 20:
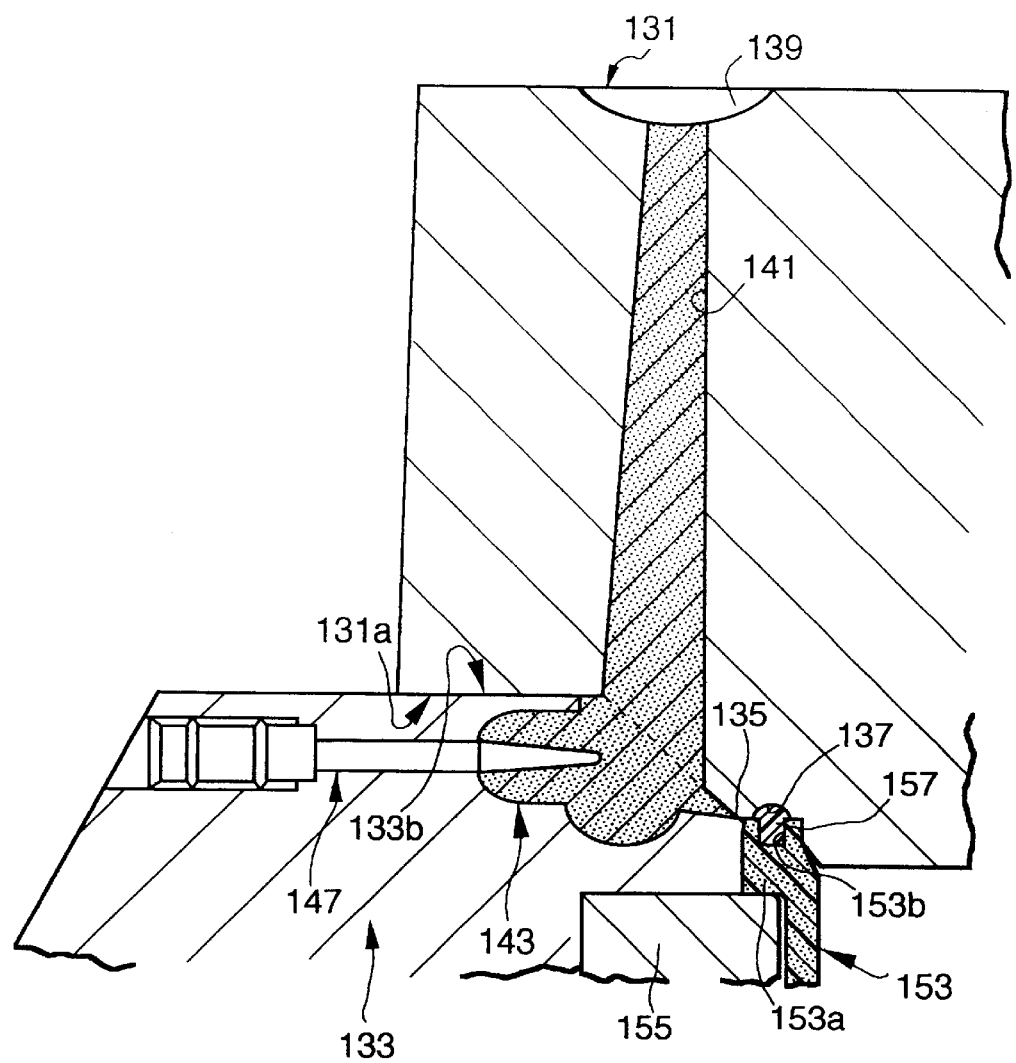
FIG. 20 is a cross-sectional view showing a condition in which a resin is supplied into the injection mold of FIG. 19.
Figure 21:
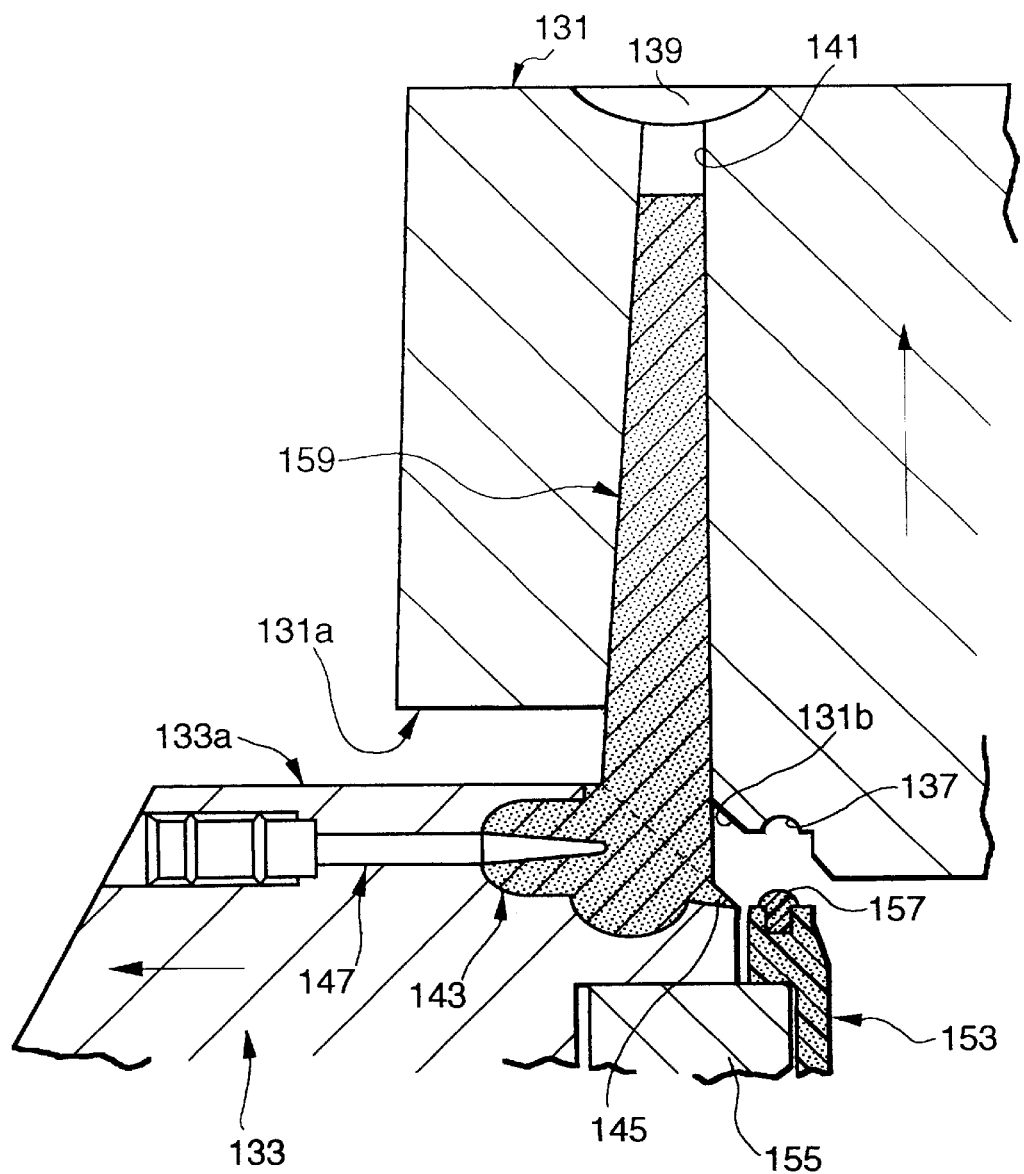
FIG. 21 is a cross-sectional view showing a condition in which a first mold is moved vertically from a position shown in FIG. 20.

The molds 131, 133 and 155, heated to a temperature, for example, of 150° C., are clamped together, with the abutment portions 131a and 133a of the first and second molds 131 and 133 held against each other as shown in FIG. 20. In this arrangement, when a resin is supplied from the nozzle 139 through the sprue 141, the resin fills in the well 143, so that gas in this portion is discharged to the exterior through the above-mentioned degassing gap and degassing groove. Then, the resin is injected through the gate portions 135 into the seal-forming space 137 and thus into an annular groove 153b in the skirt portion 153a of the heat exchanger tank 153, thereby forming a seal member 157.

After the resin is solidified, the first mold 131 is moved vertically while the second molds 133 are moved horizontally. Since the front end portion of the runner holder pin 147 is embedded in that portion of a runner 159 solidified in the well 143 in the second mold 133, the runner holder pin 147 prevents the runner 159 from moving in the vertical direction. The movement of the first mold 131 causes that portion of the runner 159, solidified in the sprue 141 in the first mold 131, to be automatically removed from the sprue 141, and also the movement of the second mold 133 causes the runner 159 to be separated from the seal member 157.

The runner 159 is then disengaged from the front end portion of the runner holder pin 147 either by the hands or by mechanical means, thus separating the runner 159 from the second mold 133. Thus, in the above injection mold, by moving the first mold 131, that portion of the runner 159 solidified in the sprue 141 in the first mold 131 can be automatically removed from the sprue 141. Hence, the runner 159 can be separated from the first mold 131 quickly and easily.

In this embodiment, the gate portion 135 is formed at the apex of the triangular space 135 formed in the slanting surface 133b. Therefore, when the second mold 133 is moved, the runner 159 is automatically separated from the resin-molded seal member 157, and thus the runner 159 can be easily separated from the seal member 157.

In the above embodiment, although the invention is applied to the injection mold for forming the seal member 157 on the heat exchanger tank 153, the present invention is not limited to such embodiment, and the invention can be applied to a wide variety of injection molds for molding a resin.

In the injection mold of the present invention, by moving the first mold, that portion of the runner solidified in the sprue in the first mold can be automatically removed from the sprue. Therefore, the runner can be separated from the mold easily.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method of producing a tank for a heat exchanger, comprising the steps of:

forming an annular groove of a rectangular cross-section in an open end surface of an annular skirt portion formed at an open end of the tank over an entire periphery thereof;

receiving said skirt portion in a space formed by molds so that an outer side surface and an inner side surface of said skirt portion are held by said molds;

urging said outer side surface and said inner side surface of said skirt portion toward each other by a projection formed on a surface of one of said molds facing one of said outer side surface and said inner side surface of said skirt portion, said projection being formed on a portion of said one of said molds operative to be opposed to a portion of said one of said outer side surface and said inner side surface of said skirt portion disposed in the vicinity of said open end surface;

guiding, by a guide surface (55) formed on said surface of said one of said molds having said projection and extending from a bottom of said projection to a portion of said one of said molds operative to be disposed in lateral registry with a bottom surface of said annular groove, the deformation of said one of said outer side surface and said inner side surface of said skirt portion toward said annular groove; and injecting a seal resin into said annular groove and a seal-forming space formed in another of said molds opposed to said annular groove.

2. The method as claimed in claim 1, wherein said guide surface extends linearly from the bottom of said projection, at an angle, to the portion of said one of said molds operative to be disposed in lateral registry with the bottom surface of said annular groove, said guiding step further comprising positively deforming said skirt portion along said angled guide surface.

* * * * *